(No Model.)
J. WALL.
CLINICAL THERMOMETER.
No. 446,140. Patented Feb. 10, 1891.
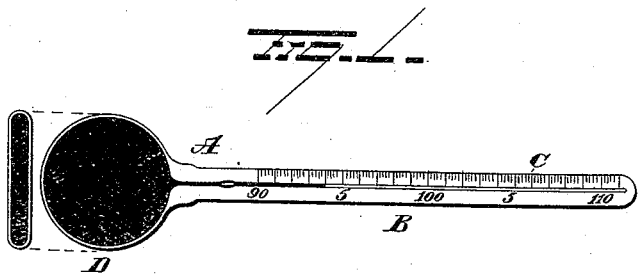
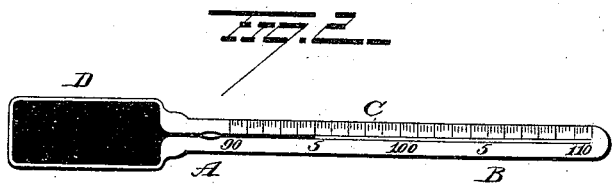
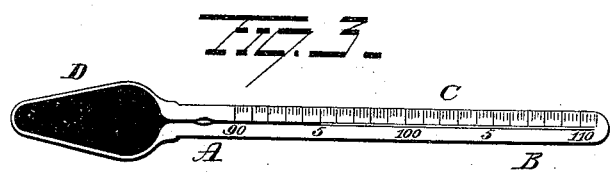
Witnesses
E. J. Nottingham
Geo. F. Downing
Inventor
John Wall
By his Attorney
H. A. Seymour

UNITED STATES PATENT OFFICE.

JOHN WALL, OF CONNERSVILLE, INDIANA.

CLINICAL THERMOMETER.

SPECIFICATION forming part of Letters Patent No. 446,140, dated February 10, 1891.

Application filed April 12, 1890. Serial No. 347,638. (No model.)

*To all whom it may concern:*

Be it known that I, JOHN WALL, a citizen of Connersville, in the county of Fayette and State of Indiana, have invented certain new and useful Improvements in Clinical Thermometers; and I do hereby declare the following to be a full, clear, and exact description of the invention, such as will enable others skilled in the art to which it appertains to make and use the same.

My invention relates to an improvement in thermometers, and more particularly to that class known in the art as "clinical" thermometers, the object being to produce a thermometer which shall be quick, sensitive, and accurate in operation.

A further object is to so construct a thermometer of the class specified that the temperature of a person can be taken quickly and with little or no inconvenience to the person.

A further object is to produce a thermometer with a bulb having an extended exposed surface.

With these objects in view the invention consists in a thermometer constructed with a flattened bulb.

It further consists in certain novel features of construction, as hereinafter set forth, and pointed out in the claim.

In the accompanying drawings, Figure 1 is a view of a thermometer illustrating one embodiment of my invention. Figs. 2 and 3 are views of modifications.

A represents a thermometer having a tube B, of any preferred construction, and a scale C. At the lower end of the tube B the bulb D is formed, and in order to render the thermometer sensitive and convenient for taking the temperature said bulb is made flat or disk shaped. The flat bulb may be made in the form of a circular disk, as shown in Fig. 1, and in such shape is peculiarly adaptable to be inserted into the mouth and axilla. Being flat, it will be easily held in the mouth, and a very large surface of the mercury in the bulb will be exposed to the action of heat. It is not essential that the faces of the bulb be perfectly flat, as they may be slightly biconvex, biplane, or biconcave, without materially affecting the sensitivity of the instrument.

Instead of making the bulb of circular form, as above described, it may be made of flat, rectangular form for the rectum, or it may be made of oval shape, or of any desired shape, so long as it is made flat and practically rectangular in cross-section. By thus constructing the bulb of a thermometer it is rendered very sensitive and easy to manipulate.

Having fully described my invention, what I claim as new, and desire to secure by Letters Patent, is—

As a new article of manufacture, a thermometer having a thin flat bulb with parallel faces, substantially as set forth.

In testimony whereof I have signed this specification in the presence of two subscribing witnesses.

JOHN WALL.

Witnesses:
WILLIAM E. OCHILTREE,
OLIVER APPLEGATE.